(12) United States Patent
Schultz

(10) Patent No.: US 6,598,481 B1
(45) Date of Patent: Jul. 29, 2003

(54) QUARTZ PRESSURE TRANSDUCER CONTAINING MICROELECTRONICS

(75) Inventor: Roger L. Schultz, Aubrey, TX (US)

(73) Assignee: Halliburton Energy Services, Inc., Dallas, TX (US)

( * ) Notice: Subject to any disclaimer, the term of this patent is extended or adjusted under 35 U.S.C. 154(b) by 0 days.

(21) Appl. No.: 09/538,536

(22) Filed: Mar. 30, 2000

(51) Int. Cl.$^7$ ................................................ G01L 11/00
(52) U.S. Cl. .............................. 73/702; 73/708; 166/248
(58) Field of Search ........................ 73/702 OR, 708 R, 73/756, 721, 727, 703; 166/248 R, 66.1, 66.5

(56) References Cited

U.S. PATENT DOCUMENTS

| | | | | |
|---|---|---|---|---|
| 3,355,949 A | * | 12/1967 | Elwood et al. | 374/117 |
| 4,607,530 A | * | 8/1986 | Chow | 73/708 |
| 4,741,213 A | * | 5/1988 | Hojoh | 73/702 |
| 4,754,646 A | * | 7/1988 | EerNisse et al. | 73/702 |
| 4,936,147 A | * | 6/1990 | EerNisse et al. | 73/702 |
| 5,048,323 A | * | 9/1991 | Stansfeld et al. | 73/32 A |
| 5,221,873 A | | 6/1993 | Totty et al. | 310/361 |
| 5,231,880 A | * | 8/1993 | Ward et al. | 73/702 |
| 5,299,868 A | * | 4/1994 | Dennis et al. | 374/117 |
| 5,317,917 A | * | 6/1994 | Dufour | 73/702 |
| 5,323,855 A | * | 6/1994 | Evans | 166/248 |
| 5,471,882 A | | 12/1995 | Wiggins | 73/702 |
| 5,578,759 A | * | 11/1996 | Clayton | 73/702 |
| 6,223,588 B1 | * | 5/2001 | Burgass et al. | 73/53.01 |
| 6,298,724 B1 | * | 10/2001 | Burgass et al. | 73/579 |

OTHER PUBLICATIONS

Patent Application Ser. No. 09/298,691, filed Apr. 23, 1999 entitled Methods of Calibrating Pressure and Temperature Transducers and Associated Apparatus—Inventor: Roger L. Schultz.

* cited by examiner

Primary Examiner—Harshad Patel
(74) Attorney, Agent, or Firm—Peter V. Schroeder

(57) ABSTRACT

Disclosed are improved pressure transducer apparatus and methods of sensing and measuring pressure, or pressure and temperature, in a subterranean environment. The transducer apparatus and methods use a piezoelectric crystal transducer with at least one internal chamber therein and electrical output terminals on the exterior of the body. One or more piezoelectric crystal sensor located in the body and associated microelectronics located in the body connect to output terminals for producing an electrical signal responsive to pressure, temperature, or temperature and pressure.

46 Claims, 3 Drawing Sheets

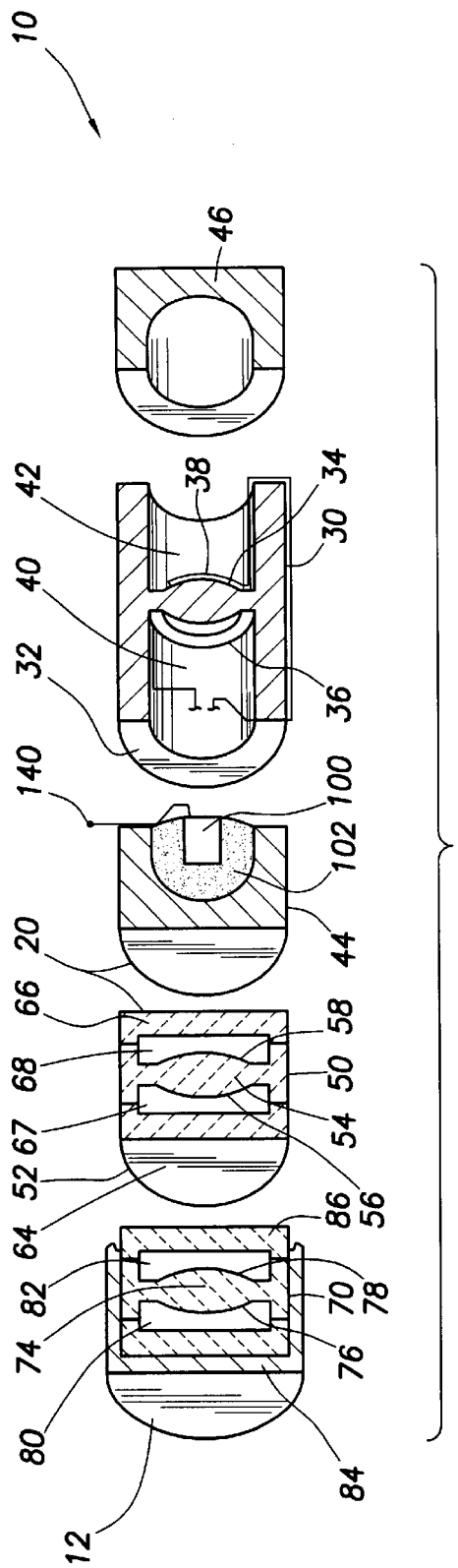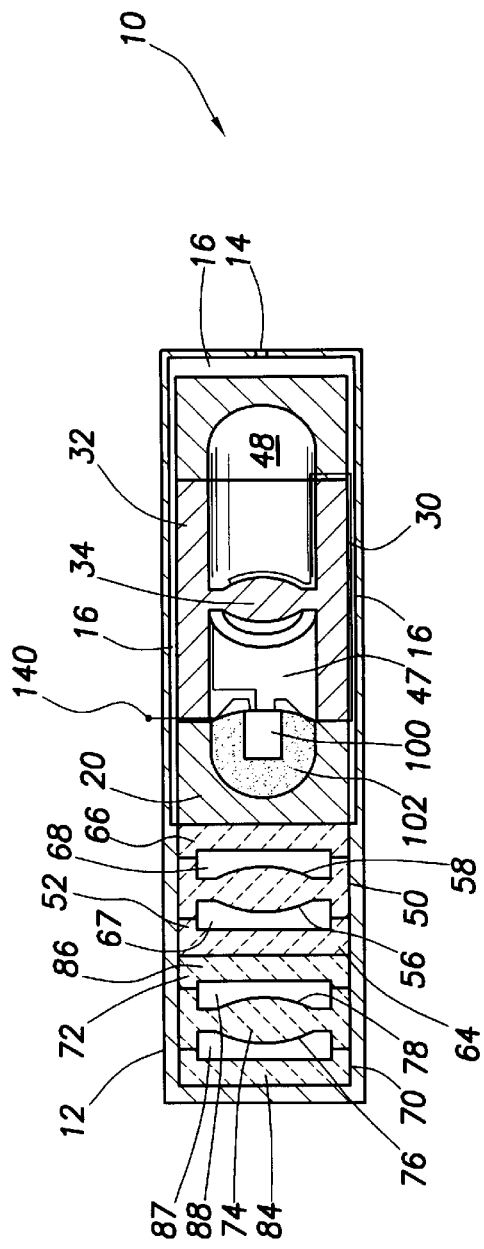

QUARTZ PRESSURE TRANSDUCER CONTAINING MICROELECTRONICS

TECHNICAL FIELD

The present inventions relate to improvements in pressure transducers for use in oil, gas, and geothermal wells, and other subterranean environments. More particularly, the present invention relates to piezoelectric crystal oscillator driven pressure and temperature transducers which are smaller, more accurate during temperature and pressure transient conditions, and respond quicker and with less calibration than those known in the art.

BACKGROUND OF THE INVENTIONS

Most physical parameters such as temperature and pressure can be converted into electrical signals by a device known as a transducer. Quartz and some other crystals will oscillate or vibrate at a particular frequency when a driving signal is applied to the crystal. As physical properties of the crystal change as a result of changes in temperature and pressure the vibration frequency changes. In piezoelectric quartz pressure and temperature transducers, the vibration frequency is measured and converted to electrical signals that vary as the pressure and temperature applied to the crystal varies.

It is common practice to use quartz pressure transducers for taking various measurements downhole in various subterranean environments. Quartz pressure transducers or pressure and temperature transducers are typically used in testing wells in order to determine temperature, pressure, and flow rate, from which further information concerning the well can be determined or estimated. Exemplary patents for transducers using temperature, pressure, and reference crystal oscillators are: U.S. Pat. No. 5,471,882 to Wiggins, and U.S. Pat. No. 5,221,873 to Totty, et al., which are incorporated herein for all purposes by this reference.

Conventional measurement systems using quartz oscillator driven transducers in wells are subject to errors caused by static and dynamic pressure and temperature induced errors. For example, physical separation of the quartz sensor and the supporting electronics allows transient temperature errors. No matter how well designed, the output signal or data from a quartz pressure transducer is affected by the temperature of the pressure sensing piezoelectric element, and the data from a temperature sensing quartz element is effected by pressure. It is common to calibrate (correct) pressure data as a function of temperature data collected at or near the pressure-measuring site. Substantial computation is required in order to convert and correct the output into an intelligible form.

Commonly, two crystal sensors are used, both of which are subjected to the temperature of the operating environment, but only one of which is subjected to the pressure parameter to be measured. The output of the temperature sensor is used to calculate the effect of temperature-induced errors on the pressure sensor. Alternatively, a single crystal is used in two different modes of oscillation, i.e., a pressure mode, and a temperature mode. As in the two-sensor method, in this type of arrangement the temperature data is used to adjust the pressure readings to compensate for temperature-induced errors. A reference crystal against which the temperature and pressure signals may be compared is also used in the art. The reference crystal provides a reference signal substantially independent of temperature and pressure that can be used in calibrating signals produced by the temperature and pressure sensors. The piezoelectric pressure sensor is designed to be responsive primarily to changes in pressure. However, piezoelectric pressure sensors in the art are somewhat responsive to changes in temperature. Conversely, the piezoelectric temperature sensor is designed to be responsive primarily to changes in temperature, but piezoelectric temperature sensors in the art are somewhat affected by changes in pressure.

Transducers in the art generally have a metal canister containing sensors, accompanied by electronics external to the transducer body. Alternatively, a larger canister is used, containing both the sensors and electronic components. The size and mass of the canister and separation of the sensor from the circuit result in errors caused by transient conditions.

SUMMARY OF THE INVENTIONS

The present inventions contemplate improved piezoelectric temperature compensated pressure transducers and improved methods for measuring pressure and temperature in a subterranean environment.

The improved apparatus and methods incorporate microelectronic means within the body of a piezoelectric crystal transducer to perform signal processing and/or calibration steps as the physical parameters of pressure and temperature are converted to electrical signals by the transducer sensors. The pressure and temperature data is then stored in or output from the body as a useable pressure or temperature reading.

The present invention provides an improved pressure transducer which outputs more immediate and more accurate pressure and temperature readings than known in the art. The present invention also provides an improved method of minimizing the physical size and mass of the transducer and associated electronics. The reduction of the physical distance between components of the transducer and associated apparatus and the overall reduction in mass, in turn minimize the temperature gradient between pressure sensor element and temperature sensor element. These improvements in signal production and data collection apparatus and methods significantly improve transient response, signal processing and data calibration requirements, and overall accuracy.

BRIEF DESCRIPTION OF THE DRAWINGS

The accompanying drawings are incorporated into and form a part of the specification to illustrate several examples of the present inventions. These drawings together with the descriptions serve to explain the principals of the inventions. The drawings are only for the purpose of illustrating preferred and alternative examples of how the inventions can be made and used and are not to be construed as limiting the inventions to only the illustrated and described examples. The various advantages and features of the present inventions will be apparent from a consideration of the drawings in which:

FIG. 1 is an exploded perspective view of one example of an improved quartz pressure transducer according to the present invention;

FIG. 2 is a cross section view of the transducer of FIG. 1;

DETAILED DESCRIPTION

Figure 3:
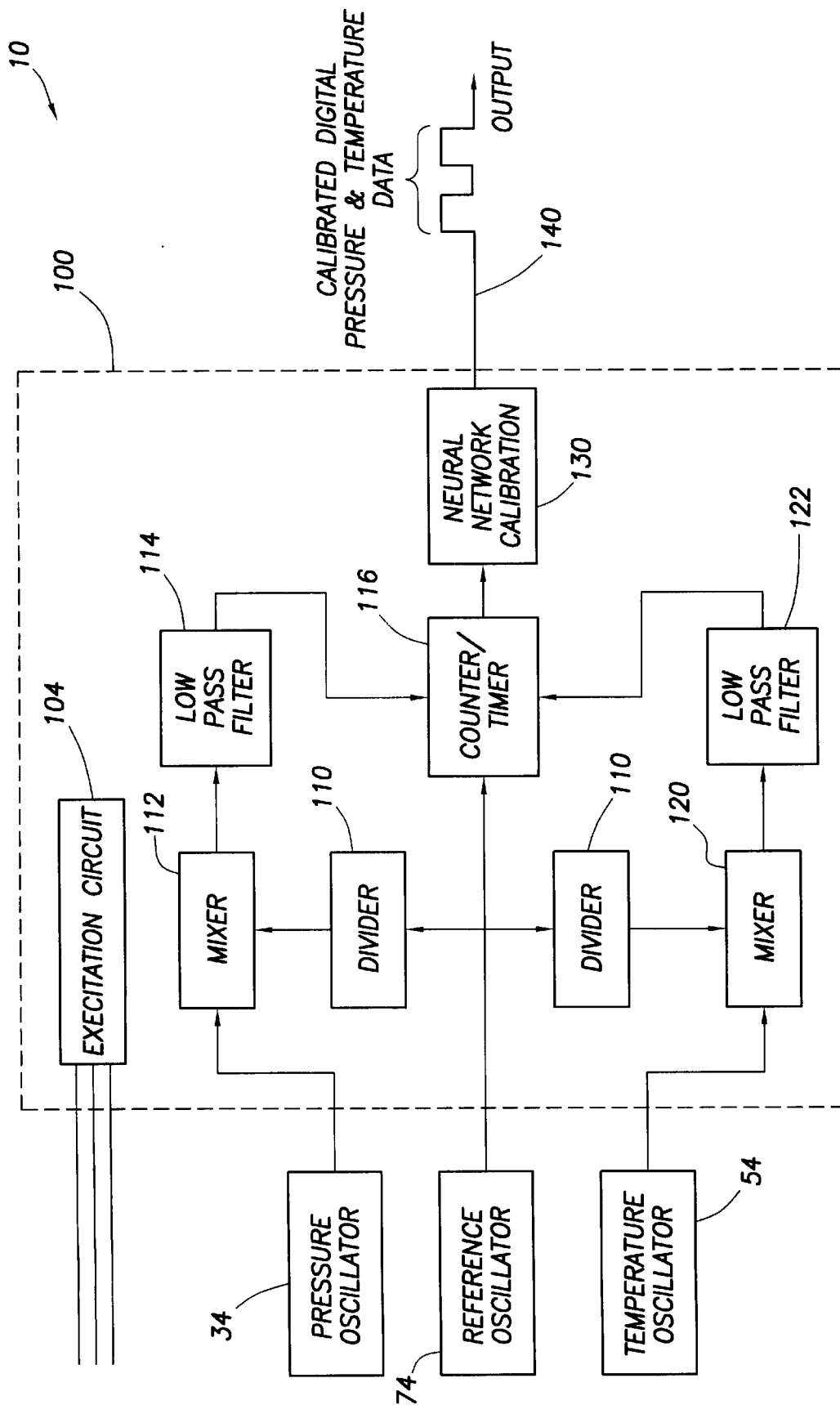
FIG. 3 is a block diagram showing the steps of the invention used in a quartz pressure transducer.

The present inventions will be described by referring to drawings of apparatus and methods showing various examples of how the inventions can be made and used. In these drawings reference characters are used throughout the several views to indicate like or corresponding parts.

The "body" of the transducer, is defined as a structure preferably cylindrical in shape formed from quartz crystal with at least one internal chamber therein.

The term "microelectronics" means highly miniaturized sub-micron electronic circuitry formed on a semiconductor material.

The effect of temperature on pressure sensors, and the effect of pressure on temperature sensors, discussed above, are referred to collectively as "temperature induced errors".

FIGS. 1 and 2 depict one embodiment of an apparatus for use in pressure transducers 10. The pressure transducer 10 of the embodiment shown preferably comprises a metal case 12, of stainless steel for example. A pressure port 14 permits fluid to enter a pressure chamber 16 inside the case 12. A transducer body 20 is cut from a quartz crystal in a manner known in the art and disclosed in '873 to Totty, et al., referenced above. The body 20 comprises three axially aligned cylindrical components machined from quartz crystal; pressure sensor 30 designed to respond to pressure, temperature sensor 50 designed to respond to temperature, and reference crystal 70 designed to resonate at a known frequency. It is known in the arts to vary the physical dimensions of crystals to adjust their sensitivity to parameters such as temperature and pressure. As far as practical, however, it is desirable that pressure sensor 30, temperature sensor 50, and reference crystal 70, have similar thermal time constants. For example, similar time constants can be achieved by fabricating the sensors of the same material, and of similar size and mass, as far as possible within the constraints of the structures required for their different functions.

With continued reference to FIGS. 1 and 2, the pressure sensor 30 is designed to produce electrical signals in response to pressure changes in pressure chamber 16. The pressure sensor 30 has a cylindrical outer wall 32. A pressure resonator 34 is integrally formed within the cylinder substantially perpendicular to the outer wall 32. The pressure resonator 34 has two opposite surfaces 36, 38. Cavities 40, 42, shown in FIG. 1, are defined on either side of the pressure resonator 34 by the cylinder wall 32 and pressure resonator surfaces 36 and 38. Quartz crystal end caps 44, 46, seal each of the cavities, forming hermetically sealed chambers 47, 48, shown in FIG. 2.

Again with reference to FIGS. 1 and 2, the body 20 of the transducer 10 has a temperature sensor 50. The temperature sensor 50 has a cylindrical outer wall 52. A temperature resonator 54 is integrally formed within the cylinder substantially perpendicular to the outer wall 52. The temperature resonator 54 has two opposite surfaces 56, 58. Cavities 67, 68, shown in FIG. 1, are defined on either side of the temperature resonator 54 by the cylinder wall 52 and temperature resonator surfaces 56 and 58. Quartz crystal end caps 64, 66, seal each of the cavities, forming hermetically sealed chambers 67, 68, shown in FIG. 2. Typically in the art, chambers 67 and 68 will be smaller in the temperature sensor 50 than the pressure sensor 30.

Yet again referring to FIGS. 1 and 2, the body 20 of the transducer 10 has a reference crystal 70. The reference crystal 70 has a cylindrical outer wall 72. A reference resonator 74 is integrally formed within the cylinder substantially perpendicular to the outer wall 72. The reference resonator 74 has two opposite surfaces 76, 78. Cavities 80, 82, shown in FIG. 1, are defined on either side of the reference resonator 74 by the cylinder wall 72 and reference resonator surfaces 76 and 78. Quartz crystal end caps 84, 86, seal each of the cavities, forming hermetically sealed chambers 87, 88, shown in FIG. 2. Typically in the art, chambers 87 and 88 will be relatively small compared to the pressure sensor chambers 37, 38.

Referring to FIGS. 1 and 2, the pressure sensor chamber 47 of FIG. 2 contains microelectronics 100. The microelectronics 100 is bonded to the crystal wall 32 with a thermally conductive material 102. It will be clear to those skilled in the arts, that according to the invention, the microelectronics 100 could alternatively be placed in chambers 48, 67, 68, 87, 88, or any combination thereof, or in a separate chamber created expressly for the purpose of containing microelectronics. It will also be readily apparent to one skilled in the arts that the microelectronics could be either on a separate piece of semiconductor material, or integrally formed into an appropriately prepared interior surface of the transducer body.

The method for measuring downhole parameters according to the invention is described referring generally to FIGS. 1–4. The transducer 10 is placed in the downhole environment 308 as shown generally in FIG. 4.

The excitation circuit 104 is used in generating a signal responsive to one or more physical parameter such as pressure or temperature. The excitation circuit is designed to produce an excitation signal, which is applied to the microelectronics in general and affects the piezoelectric crystal of the corresponding parameter in particular. The microelectronic circuitry, which includes the piezoelectric crystals, responds to the excitation signal first producing an analog output signal responsive to the particular physical parameter. The microelectronic circuitry of the invention also includes circuitry for processing the signal to produce a processed signal proportional to the physical parameter. This is done by changing the form of the analog output signal to be compatible with digital microelectronics by methods known in the arts. The digital signal is then read using the microelectronics, which performs operations correcting the read signal to produce an output signal proportional to the actual parameter value. The processed signal is then transmitted to output terminals. There are many methods known in the arts that may be used to accomplish the above steps in accordance with the invention. For example, various methods exist for producing an excitation circuit, for converting an analog signal to a digital signal, or for processing a digital signal, and are not described in detail.

Referring to FIG. 3, the transducer microelectronics 100 includes features known in the art. The microelectronics 100 has excitation circuitry 104. The excitation circuitry 104 produces excitation signals for electrically exciting the pressure resonator 34, temperature resonator 54, and reference crystal resonator 74. In response to the excitation signal and physical parameters of temperature and pressure, the pressure sensor 30 produces an electrical signal input to the microelectronics 100. Also in response to the excitation signal and physical parameters of temperature and pressure, the temperature sensor 50 produces an electrical signal input to the microelectronics 100. Additionally, in response to the excitation signal, the reference crystal 70 produces an electrical signal input to the microelectronics 100. The microelectronics 100 of the shown embodiment comprise means for dividing 110 the reference crystal signal into two identical reference signals. The microelectronics also includes means for mixing 112 the pressure sensor signal with reference signal. The resulting signal is passed through a suitable filter 114 and the filtered signal is passed to a timing means 116.

Further referring to FIG. 3, a means for mixing 120 the temperature sensor signal with the reference signal is provided. The resulting signal is passed through a suitable filter 122 and the filtered signal is passed to the timing means 116. The timing means output signal is passed to a neural network signal processing means 130 for further processing as disclosed in the application of Schultz, Ser. No. 09/298,691 referenced above. The output signal of the neural network signal processing means is the transducer output signal emitted from the output terminals 140, in the form of a pressure reading, or pressure and temperature readings.

Figure 4:
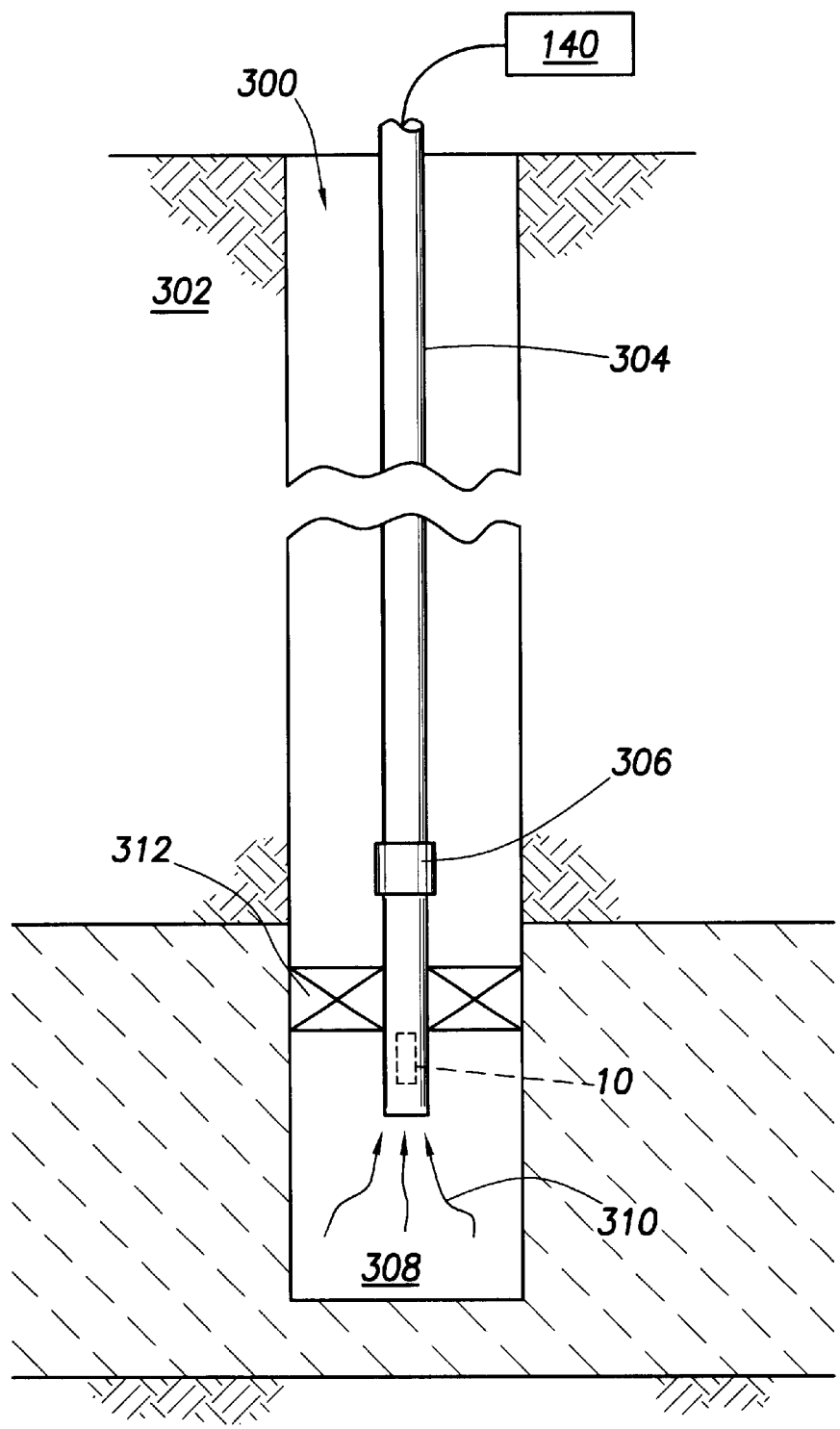
FIG. 4 is a diagram of how the invention is used in a quartz pressure transducer down-hole in an oil or gas well environment.

Representatively illustrated in FIG. 4 is a method of measuring pressure and temperature in an oil or gas well 300 in the earth 302. The transducer assembly 10 is lowered through tubing 304 containing a valve 306 into a downhole environment 308 containing a fluid such as oil or gas 310. The downhole environment 308 can be sealed by means of packing 312 and the valve 306. The temperature and pressure parameters of the fluid 310, are transformed into electrical signals by the transducer assembly 10, and transmitted to the surface as pressure, or temperature and pressure readings at the output terminals 140.

The embodiments shown and described above are only exemplary. Many details are found in the art such as: Piezoelectric crystal sensor bodies comprising other materials such as barium titanate, lead titanate, lead zerconate, etylenediamate tartate, lead metaniolbate, sapphire, silicon carbide, aluminum silicate, or gallium orthophosphate. Additionally, the transducer body need not necessarily be cylindrical. It is particularly advantageous to use a spherical body for extremely high-pressure applications. Therefore many such details are neither shown nor described. It is not claimed that all of the details, parts, elements, or steps described and shown were invented herein. Even though numerous characteristics and advantages of the present inventions have been set forth in the foregoing description, together with details of the structure and function of the inventions, the disclosure is illustrative only, and changes may be made in the detail, especially in matters of shape, size and arrangement of the parts within the principles of the inventions to the full extent indicated by the broad general meaning of the terms used in the attached claims.

The restrictive description and drawings of the specific examples above do not point out what an infringement of this of this patent would be, but are to provide at least one explanation of how to practice, make and use the inventions. The limits of the inventions and the bounds of the patent protection are measured by and defined in the following claims.

What is claimed:

1. An apparatus for measuring at least one parameter in a subterranean well comprising:
   a piezoelectric crystal body forming a resonator and a housing, the housing having at least one end cap and at least one chamber therein; and
   microelectronics housed in the at least one chamber.

2. An apparatus as in claim 1, the piezoelectric crystal having two chambers therein, the chambers separated by the resonator.

3. An apparatus as in claim 2, wherein the chambers are sealed.

4. An apparatus as in claim 1, wherein the at least one end cap and the housing are of a single piece.

5. An apparatus as in claim 1, wherein the at least one end cap is of piezoelectric crystal material.

6. An apparatus as in claim 1 the piezoelectric crystal operable to measure pressure.

7. An apparatus as in claim 1, wherein the piezoelectric crystal is responsive to temperature.

8. An apparatus as in claim 1 wherein the piezoelectric crystal is responsive to pressure and temperature.

9. An apparatus as in claim 1, the piezoelectric crystal comprising a reference crystal.

10. An apparatus as in claim 1 wherein the microelectronics are bonded to the piezoelectric crystal with a thermally conductive material.

11. An apparatus as in claim 10 wherein the microelectronics are operable to perform operations to produce an output signal proportional to the parameter being measured.

12. An apparatus as in claim 1 the microelectronics operable to produce an excitation signal and operably connected to the piezoelectric crystal to cause the piezoelectric crystal to vibrate.

13. An apparatus as in claim 1, the microelectronics operable to produce a digital signal responsive to vibration in the piezoelectric crystal.

14. An apparatus as in claim 13, the microelectronics operable to process the digital signal.

15. An apparatus as in claim 1, wherein the piezoelectric crystal is quartz, barium titrate, lead titrate, lead zerconate, etylenediamate tartrate, lead metaniolbate, sapphire, silicon carbide, aluminum silicate or gallium orthophosphate.

16. An apparatus as in claim 1, wherein the microelectronics further comprises an oscillator.

17. An apparatus as in claim 1, wherein the microelectronics further comprises a temperature oscillator.

18. An apparatus as in claim 1 wherein the microelectronics further comprises a reference oscillator.

19. An apparatus for measuring at least one parameter in a subterranean well, the apparatus comprising:
    a case defining an interior space;
    a first sensor of piezoelectric crystal having at least one chamber and a resonator, the first sensor housed in the interior space of the case;
    a second sensor of piezoelectric crystal having at least one chamber; and
    microelectronics housed in at least one of the chambers of the crystals, the microelectronics operably connected to both crystals.

20. An apparatus as in claim 19, the microelectronics further having an excitation circuit operable to produce vibration in the first and second piezoelectric crystals, an input circuit operable to receive input from the first and second piezoelectric crystals and a calibration circuit operable to produce an output signal proportional to the parameters being measured by the the first and second piezoelectric crystals.

21. An apparatus as in claim 20 wherein the calibration circuit includes a neural network calibrator.

22. An apparatus as in claim 19, the microelectronics having an excitation circuit operable to drive at least one of the crystals.

23. An apparatus as in claim 19, the microelectronics having input means for receiving input from at least one of the crystals.

24. An apparatus as in claim 19, the microelectronics having a calibration means.

25. An apparatus as in claim 19 wherein the calibration means comprises a neural network.

26. An apparatus as in claim 19, the microelectronics having output terminals.

27. An apparatus as in claim 19, further comprising a reference crystal having at least one chamber and a resonator, the reference crystal housed in the interior space of the case, the microelectronics operably connected to the reference crystal.

28. An apparatus as in claim 27, the microelectronics having an excitation circuit operable to drive at least one of the crystals.

29. An apparatus as in 27, the microelectronics having input means for receiving input from at least one of the crystals.

30. An apparatus as in claim 27, the microelectronics having a calibration means.

31. An apparatus as in claim 30 wherein the calibration means comprises a neural network.

32. An apparatus as in claim 27, the microelectronics having output terminals.

33. An apparatus as in claim 19, wherein the microelectronics further comprise an oscillator.

34. An apparatus as in claim 19, wherein the microelectronics further comprise a reference oscillator.

35. A method of measuring at least one parameter in a subterranean well, the method comprising the steps of:

placing in the subterranean well a measuring device, the measuring device comprising at least one piezoelectric crystal having at least one chamber therein and microelectronics housed in the at least one chamber; and exposing the at least one piezoelectric crystal to at least one well parameter to be measured.

36. A method of measuring as in claim 35, wherein the measuring device is responsive to pressure.

37. A method of measuring as in claim 35, wherein the measuring device comprises a reference crystal.

38. A method of measuring as in claim 35, further comprising the step of exciting the at least one crystal to vibrate.

39. A method of measuring as in claim 35, further comprising the step of acquiring a signal from the at least one piezoelectric crystal responsive to at least one well parameter.

40. A method of measuring as in claim 39, further comprising the step of transmitting an output signal from the microelectronics.

41. A method of measuring as in claim 40, further comprising the step of calibrating the signal acquired from the at least one piezoelectric crystal.

42. A method of measuring as in claim 41, wherein the step of calibrating includes using a neural network.

43. A method of measuring as in claim 35, wherein the step of placing a measuring device further comprising placing the measuring device having at least one of the chambers sealed.

44. A method of measuring as in claim 35, the step of placing a measuring device further comprising placing the measuring device having at least one piezoelectric crystal having at least one end cap.

45. A method of measuring as in claim 44, wherein the step of placing a measuring device further comprising placing the measuring device having at least one end cap of piezoelectric crystal material.

46. A method of measuring as in claim 35, wherein the step of placing a measuring device further comprising placing the measuring device having microelectronics comprising an oscillator.

* * * * *